(12) United States Patent
Gradishar et al.

(10) Patent No.: US 7,143,125 B2
(45) Date of Patent: Nov. 28, 2006

(54) METHOD AND APPARATUS FOR NOISE SHAPING IN DIRECT DIGITAL SYNTHESIS CIRCUITS

(75) Inventors: Thomas L. Gradishar, Boynton Beach, FL (US); Robert Stengel, Pompano Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 622 days.

(21) Appl. No.: 10/414,698

(22) Filed: Apr. 16, 2003

(65) Prior Publication Data

US 2004/0210611 A1 Oct. 21, 2004

(51) Int. Cl.
*G06F 1/02* (2006.01)

(52) U.S. Cl. ..................................................... 708/271

(58) Field of Classification Search ................ 708/103, 708/271; 327/114, 115
See application file for complete search history.

(56) References Cited

U.S. PATENT DOCUMENTS

| | | | |
|---|---|---|---|
| 4,410,954 A | | 10/1983 | Wheatley, III |
| 4,933,890 A | | 6/1990 | Nuytkens et al. |
| 5,247,469 A | | 9/1993 | McCune, Jr. |
| 5,825,253 A | * | 10/1998 | Mathe et al. ................. 331/18 |
| 5,838,210 A | | 11/1998 | Midya et al. |
| 6,396,313 B1 | * | 5/2002 | Sheen ......................... 327/105 |
| 6,670,854 B1 | * | 12/2003 | Takeda et al. ............... 331/1 A |
| 6,844,758 B1 | * | 1/2005 | Smith ......................... 327/105 |

OTHER PUBLICATIONS

Hurst, P. J., Rothenberg, B., "*A Programmable Clock Generator that Uses Noise Shaping and Its Application in Switched-Capacitor Filters*", IEEE Journal of Solid State Circuits, vol. 30, No. 4, Apr. 1995.

Rahkonen, T., Eksyma, H., Repo, H., "*A DDS Synthesizer with Time Domain Interpolator*", IEEE, Sep. 1999.

Vankka, Jouko, "*Methods of Mapping from Phase to Sine Amplitude in Direct Digital Synthesis*", IEEE Transactions of Ultrasonics, Ferroelectrics, and Frequency Control, vol. 44, No. 2, Mar. 1997.

Vankka, Jouko, "*Spur Reduction Techniques in Sine Output Direct Digital Synthesis*", 1996 IEEE International Frequency Control Symposium, IEEE, Aug. 1996.

Harris, F., McKnight, B., "*Error Feedback Loop Linearizes Direct Digital Synthesizers*", IEEE, 1996.

O,Leary, P., Maloberti, F., "*A Direct-Digital Synthesizer with Improved Spectral Performance*", IEEE Transactions on Communications, vol., 39, No. 7, Jul. 1991.

Hideyuki Nosaka, "A Phase Interpolation Direct Digital Synthesiser with a Digitally Controlled Delay Generator", Symposium on VLSI Circuits Digest, 1997, 75-76, NTT Wireless Systems Laboratories, Kanagawa, Japan.

Hideyuki Nosaka, "A Non-Binary Direct Digital Synthesiser with an Extended Phase Accumulator", IEEE Transactions on Ultrasonics, Ferroelectrics, and Frequency Control, vol. 48, No. 1, Jan. 2001, 293-298, IEEE, USA.

(Continued)

*Primary Examiner*—Chuong D. Ngo (57) ABSTRACT

A direct digital synthesizer (30) with noise shaping circuitry can comprise a ROM-less direct digital synthesizer having a quantizer (40) and a noise shaping loop incorporating the quantizer for shaping a quantization noise due to noise from the quantizer. The noise shaping loop can comprise a noise shaping filter (44) and the noise shaping loop can feed back to the noise shaping filter a difference between an input signal (49) to the quantizer and an output signal (43) from the quantizer. The ROM-less direct digital synthesizer can further include a dither (39) combined at an input of the quantizer.

24 Claims, 7 Drawing Sheets

OTHER PUBLICATIONS

Liu Zhaohui, "DDS (Direct Digital Synthesizer) Technique and Its Implementation in Homing System Test Equipment", Proceedings of ICSP, 2000, 1984-1986,IEEE, USA.

Siamak Mortezapour, "Design of Low-power ROM-Less Direct Digital Frequency Synthesizer Using Nonlinear Digital-to-Analog Converter", IEEE Journal of Solid-State Circuits, vol. 34, No. 10, Oct. 1999, 1350-1359, IEEE, USA.

Kenneth A. Essenwanger, "Sine Output DDSs A Survey of the State of the Art", IEEE International Frequency Control Symposium, 1998, 370-378, IEEE, USA.

Timo Rahkonen, "A DDS Synthesizer with Time Domain Interpolation", University of Oulu, FINLAND and Martis Tellabs, 1999, 327-330, IEEE, USA.

* cited by examiner

METHOD AND APPARATUS FOR NOISE SHAPING IN DIRECT DIGITAL SYNTHESIS CIRCUITS

FIELD OF THE INVENTION

This invention relates generally to noise shaping, and more particularly to a method and system for noise shaping quantization noise in direct digital synthesis (DDS) circuits.

BACKGROUND OF THE INVENTION

Conventional ROM-based implementations for noise shaping DDS circuits typically include a Read-Only Memory (ROM) having a look-up table, a digital-to-analog converter (DAC), and a filter that produces a sinusoidal output. From the sinusoidal output, a digital clock signal can be produced using a comparator. ROM-less systems, on the other hand, work in conjunction with a digital-to-phase converter or a digital-to-time converter (DTC) to directly provide a square wave. With respect to the present invention, a "ROM-less DDS" does not include a ROM to look-up values for a value of sine as a function of phase, but may incidentally have other ROM devices used for other purposes (such as for compensation for mismatch on a delay line, for example).

Figure 4:
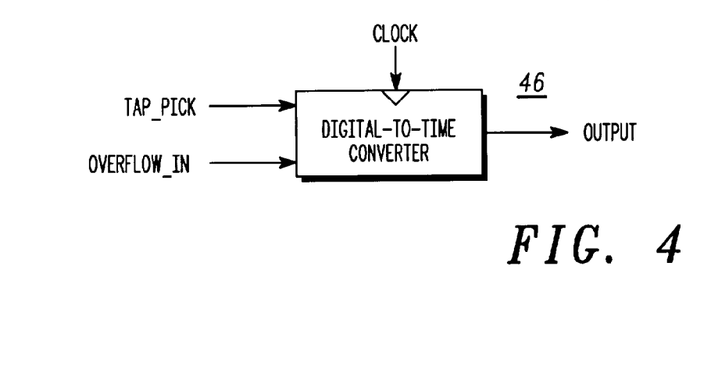
FIG. 4 is a block diagram of digital-to-time converter used in conjunction with the present invention.
Figure 5:
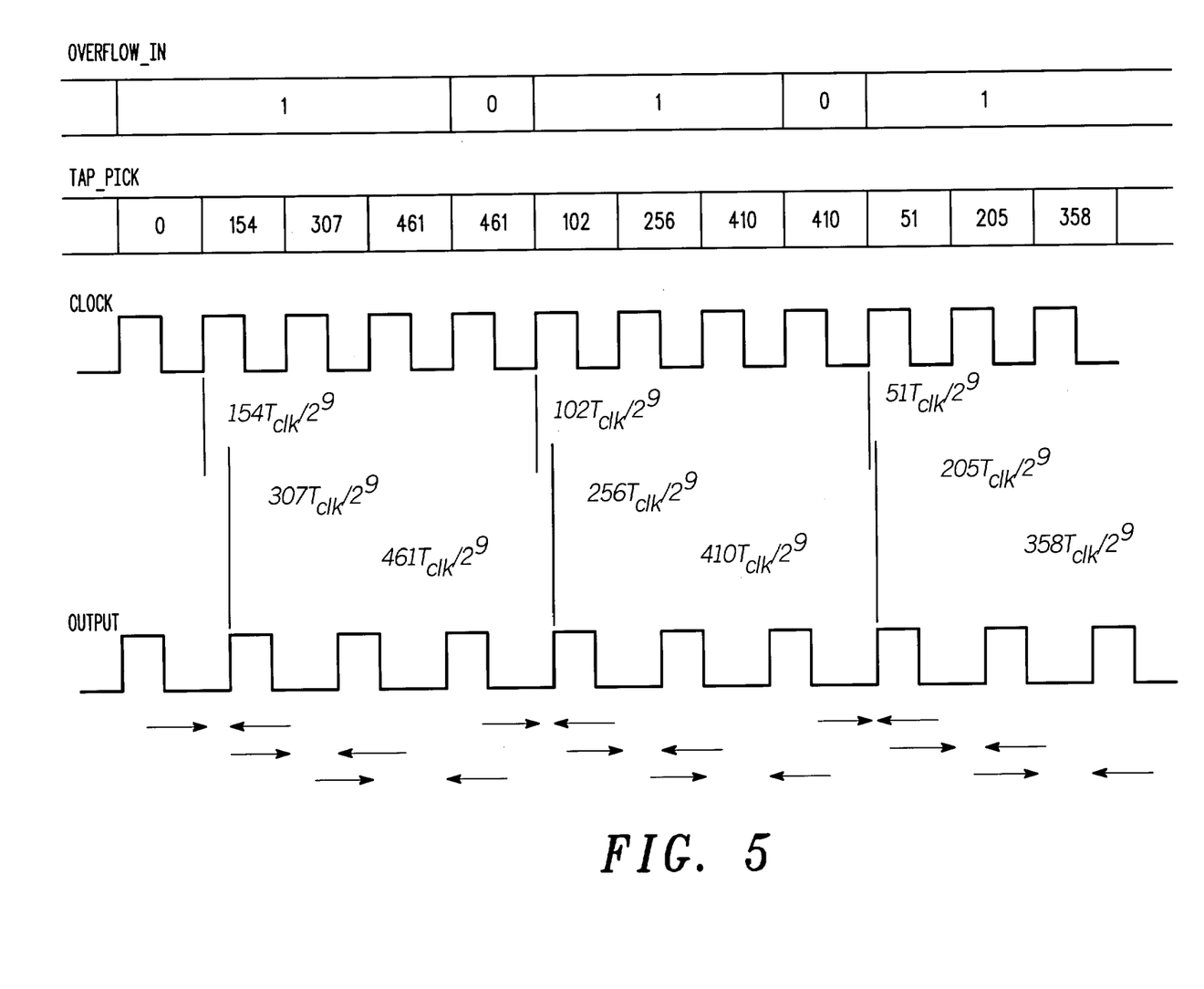
FIG. 5 is a timing diagram illustrating the operation of the digital-to-time-converter of FIG. 4.

The behavior of a DTC 46 is illustrated in FIGS. 4 and 5. The DTC produces a delayed pulse, where the delay between the edge of the system clock and the rising edge of the output pulse depends on the input, TapPick. The DTC 46 is enabled to output a pulse when the input, overflow_in, is HIGH. TapPick is an integer that is N+1 bits wide and ranges from 0 to $2^N$, and since the total delay of the delay line is matched to the clock period, $T_{clk}$, the delay between the edge of the system clock and the rising edge of the output pulse equals $$\frac{T_{clk} \cdot TapPick}{2^N}.$$

TapPick=$2^N$ produces the same pulse as would TapPick=0 in the next cycle, hence a different implementation of the DTC could allow TapPick to range only from 0 to $2^N-1$.

Figure 7:
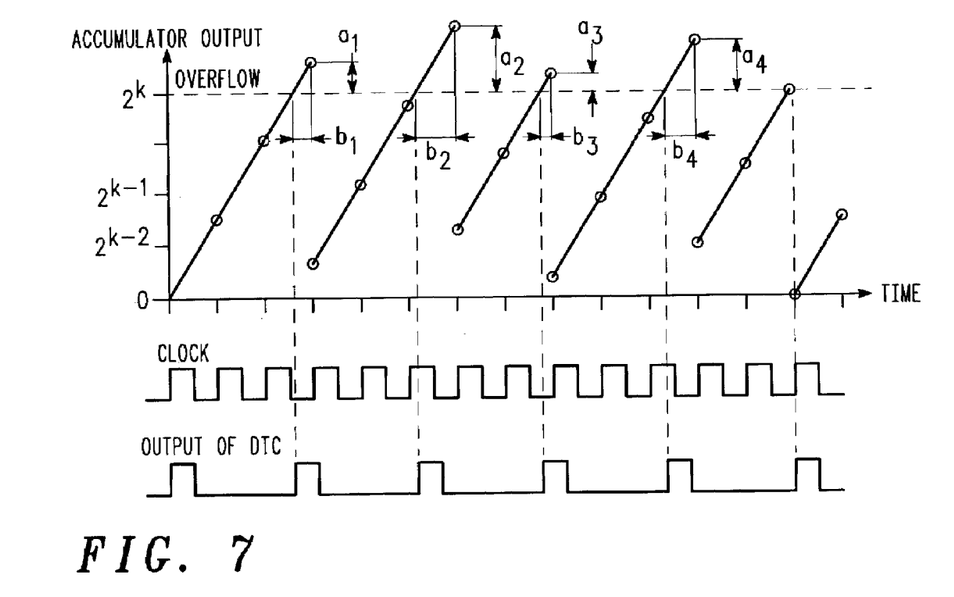
FIG. 7 is a timing diagram useful in the understanding of the present invention.

A typical ROM-less DDS circuit computes the inputs of the DTC using an accumulator and a divider. FIG. 7 shows a plot of the output of the accumulator, and the corresponding output of the DTC. A cycle in which the accumulator output crosses through $2^k$, where k is the width of the accumulator, is a cycle in which overflow=1. The DTC places a pulse in its output that aligns with the point where the accumulator output crosses through $2^k$, as shown in FIG. 7.

The purpose of the divider is to compute the quotient $$Q = \frac{b}{T_{clk}}$$

where b is the amount of time between the phase-crossing point and the next clock edge, as shown in FIG. 7. Using $\Delta x = \Delta y/\text{slope}$, an equivalent expression is $$Q = \frac{a(n)}{\text{accum\_in}(n-1)}$$

where a(n) is the output of the accumulator, after dropping the overflow bit, as indicated in FIG. 7, and accum_in is the value of the input of the accumulator in the previous cycle. Since $0 \leq a(n) < \text{accum\_in}(n-1)$, it follows that $0 \leq Q < 1$.

The output of the divider equals $$\text{DivOut}=q_0.q_{-1}q_{-2}q_{-3}q_{-4}q_{-5}q_{-6} \cdots q_{-m}$$

where $q_0$ is worth 1, $q_{-1}$ is worth ½, $q_{-2}$ is worth ¼, etc. It's impossible for the divider to compute the exact quotient in cases where it can't be represented using a finite number of binary digits (e.g. ⅓). The last digit of Q is nearest-neighbor rounded. This is implemented by examining the final partial remainder. Because of the rounding, the range of DivOut is $0 \leq \text{DivOut} \leq 1$, which is different from the range of Q in that it's inclusive of one.

In a typical prior-art system, the TapPick is computed using:

$$\text{TapPick}=2^N-\text{round}(2^N Q)$$

where N is the width of the DTC. The form of this equation follows from the following observations. As described above, Q is the ratio $Q=b/T_{clk}$, where b is the distance from the rising edge of the pulse to the next clock edge. On the other hand, as noted in the description of the DTC, TapPick is proportional to the distance from the prior clock edge to the rising edge of the pulse.

Given that the last digit of the output of the divider is rounded-to-the-nearest, TapPick can be computed using DivOut only if $m \geq N$. If $m > N$, rounding is required; but if $m=N$, no rounding is required, since the last digit of DivOut is already rounded-to-the-nearest. Hence, $$\text{TapPick}=2^N-\text{round}(2^N \text{ DivOut}), \text{ if } m>N$$

$$\text{TapPick}=2^N-(2^N \text{ DivOut}), \text{ if } m=N$$

It is a waste to make the divider compute more quotient digits than necessary, i.e. $m>N$. Since TapPick is rounded to the nearest integer, the error due to rounding, i.e. the quantization error, is white, i.e. it has a flat spectral density. (This assumes the output is modulated, or that dither is used if the output is unmodulated, to suppress patterns in the quantization error.)

Applications of ROM-less DDS circuits exist that require a low level of quantization noise. For example, a ROM-less DDS can be used to produce the local oscillator signal for a mixer in a superheterodyne receiver. Also, the output of a ROM-less DDS can be FM/PM modulated and coupled through an amplifier to an antenna; since the output of the ROM-less DDS is a pulsed signal, it can be very efficiently amplified. For applications such as these, certain bands of the spectrum usually require a lower level of noise than other bands. A need exists for a method of shaping the quantization noise. That is, a need exists for a method of pushing noise power from a signal band that is more sensitive to noise into a band that can tolerate a higher level of noise.

Noise-shaping circuits exist for ROM-based DDS circuits. There are 2 undesirable properties associated with these existing circuits. The power dissipated by the loop does not scale with the output frequency; it's approximately a constant independent of the output frequency. Also, existing loops for shaping the quantization noise associated with quantizing the output of the lookup table to produce an input for a D/A converter have the undesirable property of an inflexible notch in the noise relative to a change in frequency. In other words and more precisely, a notch in the noise placed by the loop at a certain frequency remains at this frequency after changing the frequency of the synthesizer output. If the location of the notch is required to change when the output frequency changes, the coefficients of the loop filter have to be changed. A need exists for a noise-shaping circuit for ROM-less DDS circuits that overcomes the detriments described above.

SUMMARY OF THE INVENTION

A method and apparatus for noise shaping quantization noise using direct digital synthesis circuits can include a ROM-less direct digital synthesizer that computes a plurality of time points, a quantizer that quantizes the plurality of time points to a plurality of adjacent edge opportunities, and a noise shaping means that selectively noise shapes the quantization noise.

In a first aspect of the present invention, a direct digital synthesizer with noise shaping circuitry can comprise a ROM-less direct digital synthesizer having a quantizer and a noise shaping loop incorporating the quantizer for shaping a quantization noise due to noise from the quantizer. The noise shaping loop can comprise a noise shaping filter and the noise shaping loop can feed back to the noise shaping filter a difference between an input signal to the quantizer and an output signal from the quantizer. The ROM-less direct digital synthesizer can further include a dither combined at an input of the quantizer.

In a second aspect of the present invention, a direct digital synthesizer can comprise an accumulator coupled to a divider and providing a plurality of edge times (such as high-precision edge times) referenced to an edge of a system clock and a noise shaping loop for receiving the plurality of times. The noise shaping loop combines an error-feedback with the plurality of edge times to provide a plurality of modified edge times. The direct digital synthesizer further comprises a quantizer within the noise shaping loop for quantizing the plurality of modified edge times and producing a plurality of output edge times. The loop can receive and process an edge time only in cycles in which an edge time is available. The overflow signal produced by the accumulator can indicate if an edge time is available.

In a third aspect of the present invention, a method of noise shaping a quantization noise using a direct digital synthesizer comprises the steps of computing a plurality of time points for a corresponding plurality of edge times in a square wave referenced to a system clock, quantizing the plurality of time points to a plurality of adjacent edge opportunities where there are multiple edge opportunities within a single clock cycle of the system clock, and selectively noise shaping the quantization noise resulting from the step of quantizing.

DETAILED DESCRIPTION OF THE DRAWINGS

A method and apparatus in accordance with the present invention is applicable to noise shaping a DDS circuit. In particular, the DDS circuit can be a ROM-less DDS circuit rather than a ROM-based DDS circuit. The noise can be shaped away from a frequency band around the carrier, away from a frequency band at an offset from the carrier, or both. The present invention can further use a dither source that can be selectively turned on when the system produces an unmodulated output, but turned off when the system produces a modulated output.

Referring again to FIG. 1, a block diagram of a ROM-less DDS 10 is shown that can produce an unmodulated or a modulated output 23. The precision for computing the edge times exceeds the "time resolution" for actually constructing the square wave. The time points at which the circuit is able to place an edge are discrete, and evenly spaced. It is necessary to quantize the edge time (such as a high-precision edge time) to an adjacent "edge opportunity" (g(n)). Quantizing the high-precision edge time to an adjacent edge opportunity corresponds to quantizing TapPick, the input of the DTC, to an integer value.

Figure 1:
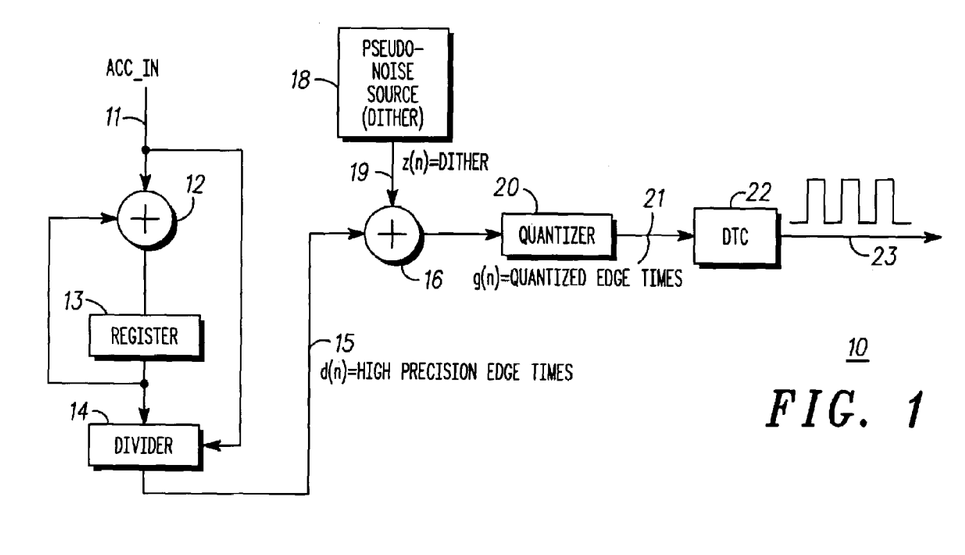
FIG. 1 is a block diagram of an existing direct digital synthesizer.

The DDS 10 of FIG. 1 can include an accumulator having an adder 12 and phase register 13 where the accumulator input 11 (acc_in) and feedback from register 13 serve as inputs to the adder 12. A divider 14 divides a residue signal or output from the register 13 by the input signal (acc_in) to provide a ratio that serves as the high-precision edge times 15 (d(n)). The high-precision edge times indicate the amount of delay that should be provided by a DTC 22. The accumulator and divider compute edge times or the time at which to place edges in the square wave at the output (See FIG. 2). The precision for computing the edge times exceeds the "time resolution" for actually constructing the square wave. Therefore, the edge times have to be quantized to an adjacent "edge opportunity."

Figure 2:
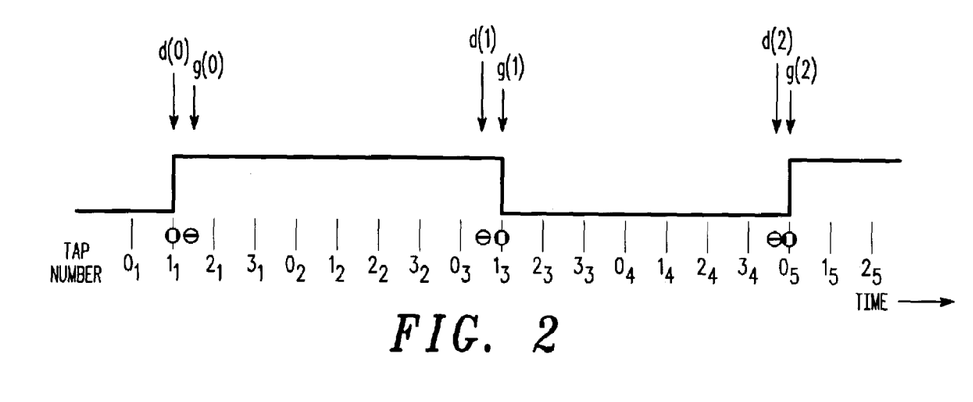
FIG. 2 is a timing diagram illustrating edge times in accordance with the present invention.
Figure 8:
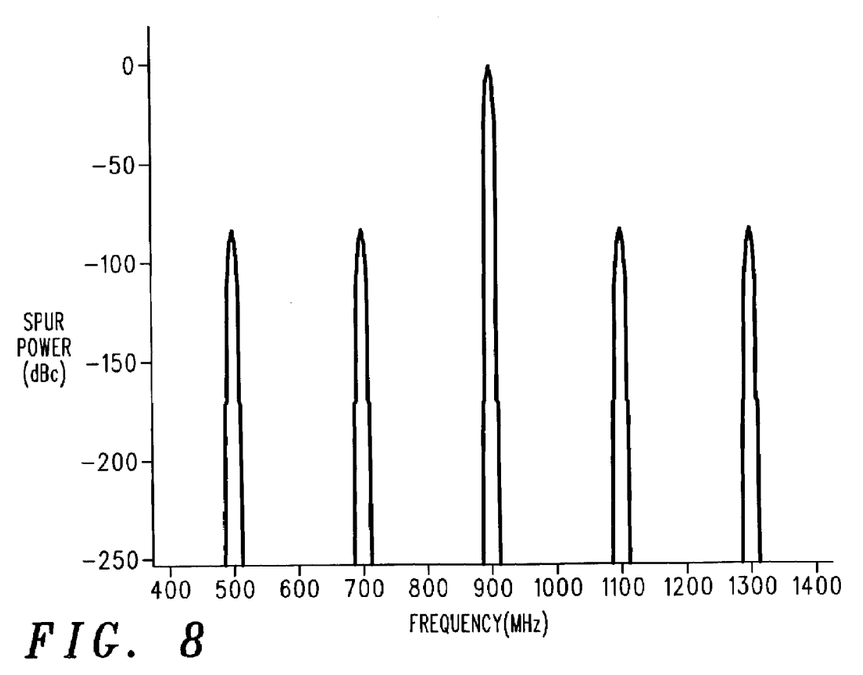
FIG. 8 is a chart illustrating the power spectral density of an unmodulated 900 MHz output for a DDS with 4096 taps using a 1 GHz system clock and no dither source.
Figure 9:
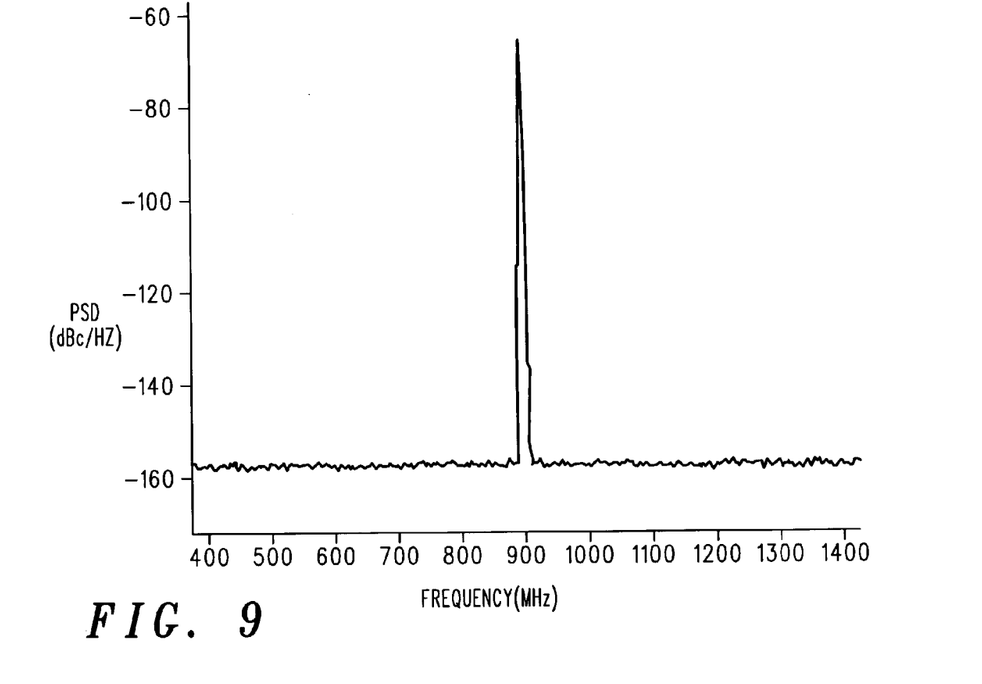
FIG. 9 is a chart illustrating the power spectral density of an unmodulated 900 MHz output for a DDS with 4096 taps using a 1 GHz system clock and a dither source uniformly distributed between a −0.5 Unit delay and a +0.5 Unit delay.

Referring to FIG. 2, a timing diagram illustrates an example of edge time quantization. The high-precision edge times (d(n)) are quantized to the nearest edge opportunity (g(n)). If the square wave output is un-modulated, i.e. if the d(n) are evenly spaced, the round-off error is correlated, i.e. there are patterns in the edge time error. These patterns cause spurs in the spectrum of the square wave output as shown in the power spectral density chart of FIG. 8. These spurs can be reduced by combining (16) the high-precision edge times with a dither 19 (z(n)) from a pseudo-noise source 18 before quantization (20) to provide quantized edge times 21 (g(n)). Adding dither helps reduce such spurs as shown in FIG. 9. After adding dither, the quantization error is random and hence the error isn't periodic anymore. The spectrum now consists of the desired line and a noise floor.

Figure 10:
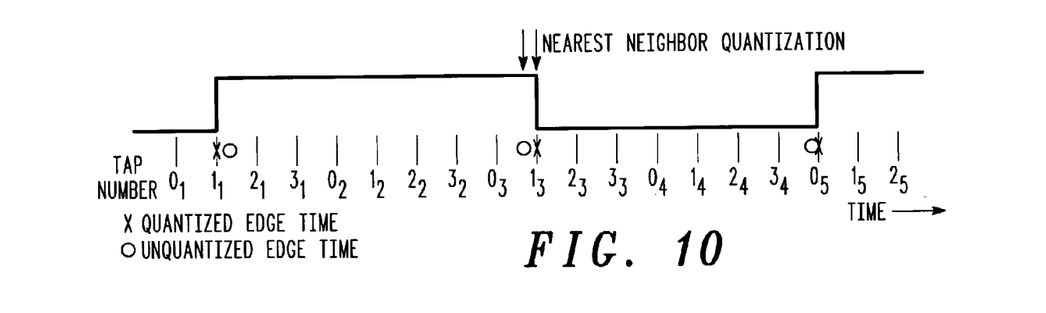
FIG. 10 is a timing diagram illustrating edge time quantization without dither.
Figure 11:
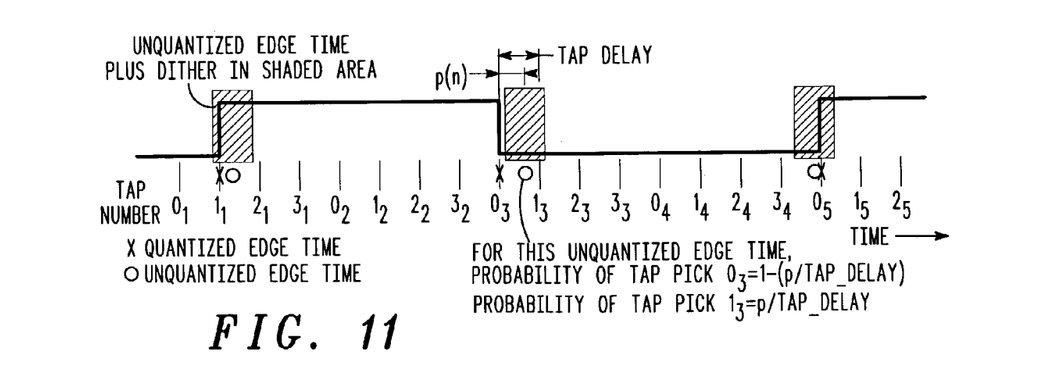
FIG. 11 is a timing diagram illustrating edge time quantization with dither.

Dither is a well-known technique that has been applied to ROM-less DDS circuits. The purpose of the dither source in FIG. 1 is to reduce the spurs in the output. The dither source adds a low level random noise, or dither, signal to the edge times. The dither signal is white and has some specified distribution. Typically, it is uniformly distributed in the range between −UnitDelay/2 to +UnitDelay/2, where Unit-Delay is the spacing of the edge opportunities. As shown in FIGS. 10 and 11, the sum of the edge time and dither lies within a certain range. The quantizer picks the "edge opportunity" that is nearest to the sum. The quantizer has a certain probability of choosing the adjacent edge opportunity in front of the high-precision edge time, and a certain probability of choosing the adjacent edge time behind it. When no dither is used as in FIG. 10, nearest neighbor quantization can be used to select the appropriate edge opportunity. With dither added as shown in FIG. 11, the bracketed or shaded region indicates the range in which lies the sum (high-precision edge time+dither.)

The sum can be nearest neighbor quantized. This randomizes the tap pick. Referring once again to FIG. 3, a block diagram of a ROM-less DDS 30 after adding the noise-shaping loop is shown in accordance with the present invention. Note that the existing DDS shown in FIG. 1 and the DDS in FIG. 3 support modulation and are entirely digital except for their respective DTCs. The purpose of the digital portion of the system is to compute TapPick and overflow_in for the DTC. The inputs fc and s(n) are 24 bits wide in the illustrated example system of the present invention, and control the output frequency. In both systems, the digital block and the DTC also can use the same system clock.

Figure 3:
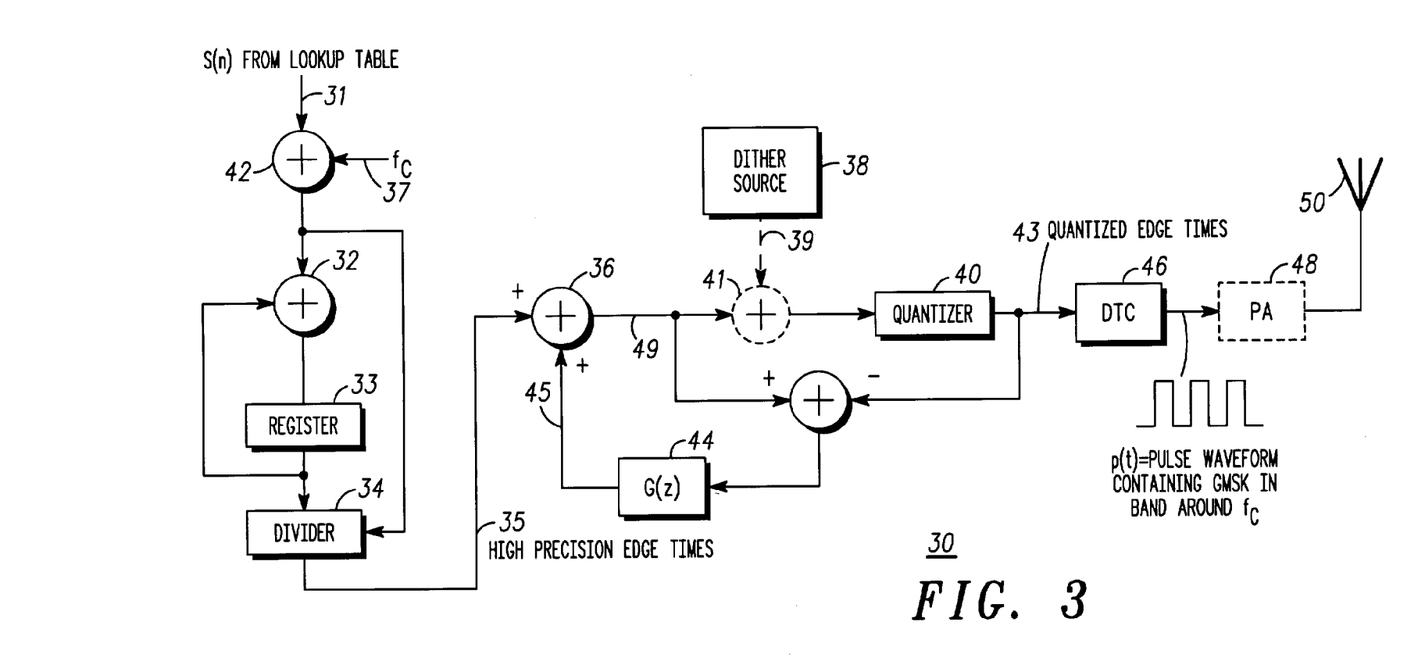
FIG. 3 is a simplified block diagram of a direct digital synthesizer having a noise shaping loop in accordance with the present invention.

The loop in DDS 30 shapes the noise power spectral density for the noise due to the edge time quantization. In the unmodulated mode (accumulator input is constant), DDS 30 could be used for the local oscillator (LO) of a transmitter or receiver, where certain bands may require a lower level of noise. The noise shaping loop can shape the noise out of these bands into bands that can tolerate a higher level of noise. In the modulated mode (accumulator input is varied), DDS 30 could output an FM/PM modulated radio frequency signal—since it is a pulsed signal, it can be very efficiently amplified using a power amplifier (PA) 48. Individual components within the PA can operate in saturation, and therefore efficiently, because of the pulsed nature of the signals. The output of the PA is connected to an antenna 50, possibly through a harmonic reduction filter. In this application, the noise-shaping loop could be used, for example, to shape noise out of the receive band using the appropriate loop filter as will be discussed below.

Figure 6:
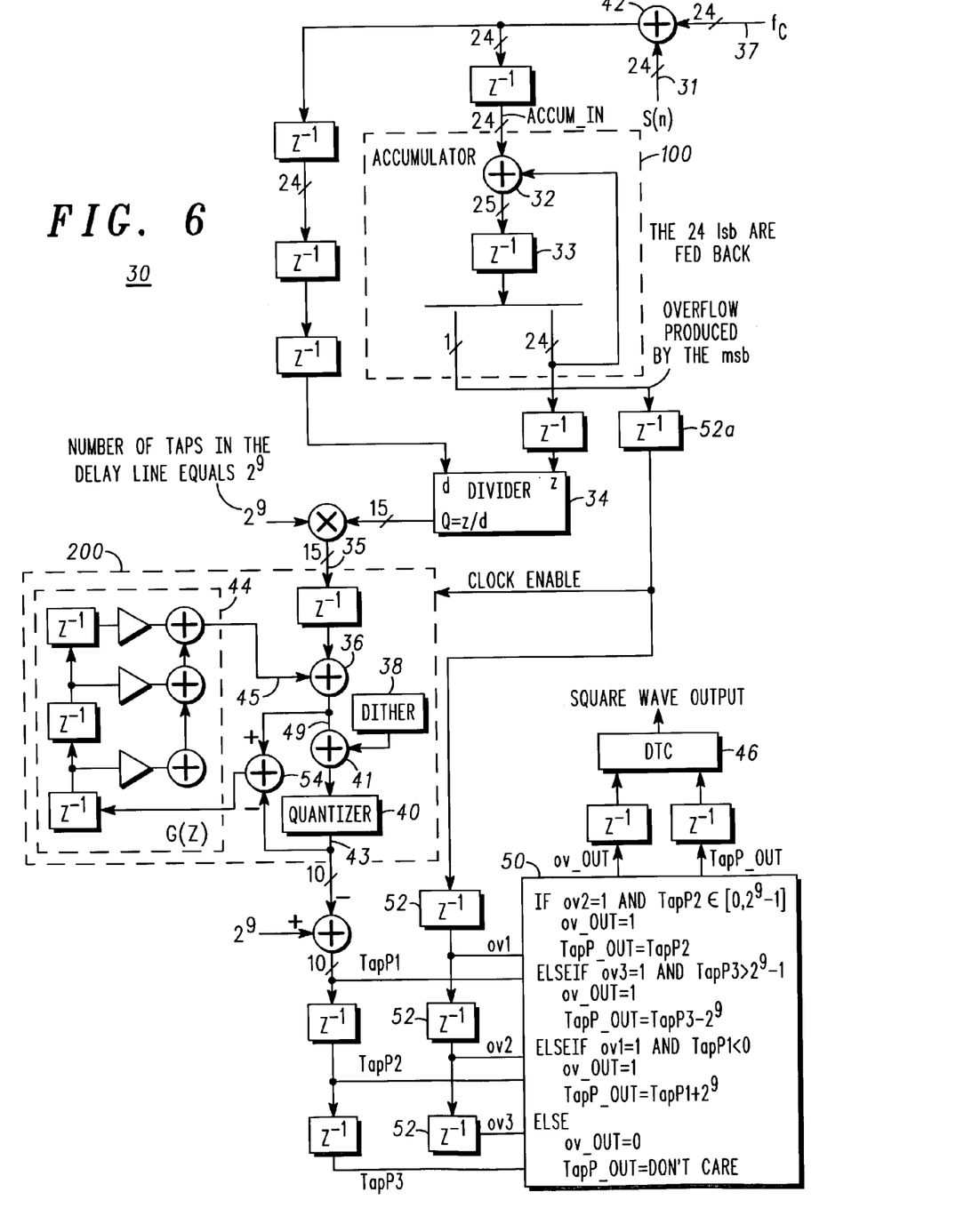
FIG. 6 is a detailed block diagram of the direct digital synthesizer of FIG. 3.

The DDS 30 of FIG. 6 illustrates a more detailed block diagram of the DDS 30 of FIG. 3. As with DDS 10 of FIG. 1, DDS 30 of FIG. 3 and FIG. 6 can include an accumulator 100 having an adder 32 and a phase register 33. An accumulator input can be a carrier frequency 37 (fc) or the carrier frequency 37 combined (42) with or modulated by an input 31 (s(n)) signal. This modulated or unmodulated input (31 and 37) and feedback from register 33 serve as inputs to the adder 32. A divider 34 divides a residue signal or output from the register 33 by the accumulator input to provide a ratio that serves as the high-precision edge times 35 or the input In(n) for the noise shaping loop 200. The noise shaping loop can include a quantizer 40 and a loop filter 44 (G(z)) that filters the difference between an input (49) and an output (43) to the quantizer 40. In(n) 35 is the raw sequence of edge times computed by the accumulator and divider 34. Error-feedback 45 is added to In(n) 35, producing the modified edge times 49 or y(n), which are then quantized, producing the output edge times 43 or Out(n). Optionally, in an unmodulated mode, a dither 39 or z(n) from a dither source 38 can be combined (41) with the modified edge times 49 to provide an input to the quantizer 40. Out(n) is then the edge opportunity closest to y(n)+z(n), and not necessarily the edge opportunity closest to In(n). The quantized edge time 43 then controls the amount of delay between the edge of the system clock and the pulse produced by the DTC 46.

Existing systems and an embodiment in accordance with the present invention system can be the same from the input of an accumulator (100) through the output of the divider (34), except the present invention system requires the divider to compute more quotient digits. For a desired output frequency, $F_{out}$, the accumulator input, i.e. the sum of fc and s(n), equals $$\text{accum\_in} = 2^k \cdot \frac{F_{out}}{F_{clk}}$$

where k is the width of the accumulator. It can be shown that the accumulator produces overflow=1 at a rate equal to $F_{out}$. The overflow signal itself can't be used for the synthesizer output, because the pulses are not evenly spaced, hence the spurious levels are very high.

The embodiments shown in accordance with the present invention require a divider that computes a larger number of quotient digits. The number of quotient digits computed after the point, m, is greater than N typically by at least 5 or 6 bits. The DDS 30 of FIG. 6 shows that the output of the divider is multiplied by $2^N$, and since m>N, the result has a whole part and a fractional part. This number is input into the noise-shaping loop 200, and using error-feedback it is quantized to an integer value. The integer is not necessarily the nearest neighbor.

The topology of the noise-shaping loop 200 is as follows. The input is summed (36) with an error feedback value (45). This sum then is combined with a low-level noise signal called dither, generated by a dither source 38. The dither source 38 is typically implemented using a PN generator, and outputs a pseudo-random variable having a certain distribution. In one embodiment, the dither is uniformly distributed between −½ and ½. The dither source is required when the output is un-modulated, in order to suppress patterns in the quantization error. If these patterns are not suppressed, they cause spurs in the spectrum of the output as previously shown in FIG. 8. If the output is modulated, the modulation itself may be sufficient to suppress the patterns, and the dither source can be turned off. (When off, the dither source outputs zeros.) The dither source spreads the energy contained in the spurs into a noise floor, and the noise-shaping loop shapes the noise floor.

The sum (41) after adding the dither is fed into the quantizer 40. The quantizer rounds to the nearest integer. From the output of the quantizer, TapPick is computed using $$TapPick = 2^N - \text{quan\_out}. \quad (10)$$

This equation is explained in the same way as the corresponding equation for the prior art sytem. quan_out is proportional to the delay between the pulse and the following clock edge, yet TapPick is proportional to the delay between the prior clock edge and the pulse.

As shown in FIG. 6, the overflow signal produced by the accumulator 100 passes into a shift-register 52 which is a series of flip-flops in parallel with the datapath (going through the divider 34). Each overflow=1 that enters the shift register 52 ultimately is applied to the DTC input, overflow_in, although it's applied in one of 3 possible clock cycles, due to a circuit that's described below. Since each overflow=1 ultimately produces a pulse at the DTC output, for each overflow=1 it's necessary to compute a TapPick.

On the other hand, overflow=0 does not produce a pulse. When the accumulator produces overflow=0, there is no need to transfer the output of the accumulator 100 into the input of the divider 34, because there's no need to compute a TapPick. This transfer is optional. If it is allowed, then the output of the divider 34 should be discarded. On the other hand, the next transfer, from the output of the divider 34 to the input of the loop 200, must not be allowed, since this would allow an invalid number to enter the loop 200. As indicated in FIG. 6, the registers in the noise-shaping loop are clock enable flip-flops, and these flip-flops are enabled to be clocked only when the divider output is valid. A clock-enable flip-flop can be used for this purpose. At the same time as the output of the accumulator 100 transfers into the input of the divider 34, the overflow bit transfers across the first flip-flop (52a) in the shift register 52. The output of this flip-flop, then, indicates if the output of the divider 34 is valid. As shown, this flip-flop output signal is used for the clock enable input of the clock-enable flip-flops. When the clock-enable equals zero, in the next clock cycle the output of the loop 200 (the output of the quantizer) is the same as in the current cycle. (An alternative implementation gates the clock, and uses the output of the flip-flop (52a) as the gating signal.)

The noise-shaping loop 200 is clocked only when a valid input appears at its input. A valid input is one that can be considered an edge time associated with a pulse produced by the DTC 46. It is an edge time in the sense that it specifies the time at which an edge should be placed in the synthesizer output. When a valid edge time is transferred into the loop 200, it's combined with a value of error-feedback 45 associated with the prior edge time. This error-feedback value 45 was computed in the cycle in which the prior edge time was processed. In the intervening clock cycles, the loop is not clocked, hence the error feedback value 45 is retained and awaits the next valid edge time.

In the loop 200 there is an adder 54 that computes the difference between the output of the quantizer 40 and the output of the adder (36) that combines the loop input and the error-feedback 45. These two values both can be considered an edge time, in the sense that they specify the time at which an edge should be placed in the synthesizer output. Both are measures of the delay time from the pulse edge to the next clock edge, i.e. both are proportional to the distance "b" in FIG. 7. The output of the quantizer 40 is a quantized version—the fractional part has been removed by rounding. Since both are a measure of the delay to the next clock edge, it can be said that the identification of time zero is the same for both. In a different cycle, the two are measures of the delay to a different clock edge, and it can be said that the identification of time zero changed. Yet it still is the same for both. The difference between two values of time does not depend on the identification of time zero, as long as it is the same for both values, and this allows the circuit 30 to change the identification of time zero.

In the prior art noise shaping loops for DDS such as those described in "Spur Reduction Techniques in Sine Output Direct Digital Synthesis" by Jouko Vankka (1996, IEEE) and in "A Direct-Digital Synthesizer with Improved Spectral Performance" by Paul O'Leary and Franco Maloberti (1991, IEEE), the noise-shaping loops are clocked in every cycle of the reference clock. In the invention, the loop is clocked in only a fraction of the cycles, equal to $F_{out}/F_{clk}$. Hence, the invention saves current drain. For the prior art noise-shaping loops, $F_{clk}$ must equal at least twice the maximum $F_{out}$. For the embodiment of the invention shown in FIG. 3 or 6, the $F_{clk}$ equals only the maximum $F_{out}$. However, as noted in a subsequent section, a different embodiment of the invention that outputs a 50% duty cycle requires $F_{clk}$ to equal at least twice the maximum $F_{out}$.

The values at the input of the noise-shaping loop 200 are within the range [0, $2^N$]. However, for a value close to zero, the corresponding output of the loop has a chance of being less than zero. For a value close to $2^N$, the corresponding output of the loop has a chance of being greater than $2^N$. A value outside the range [0, $2^N$] corresponds to an edge time outside the cycle. The DTC 46 often does not support a value of TapPick outside this range. For a value that's less than 0, it's necessary to add $2^N$ and deliver the overflow_in to the DTC 46 one cycle earlier. For a value that's greater than $2^N$, it's necessary to subtract $2^N$ and deliver the overflow_in to the DTC one cycle later. Unfortunately, for large $F_{out}$, it's possible there already is an overflow=1 in the adjacent cycle, and the DTC 46 does not allow more than one pulse per cycle. For $F_{out} < F_x$, this is guaranteed to not occur, where $F_x$ depends on the G(z), the distribution of the dither source, and the width of the DTC (the parameter N). If N is large, $F_x$ is very close to the maximum $F_{out}$, $F_{clock}$.

With respect to duty cycle, note that the signal at the output of the DTC 46 shown in FIG. 7 does not have a 50% duty cycle. In many applications, a 50% duty cycle is desirable.

One way to produce a 50% duty cycle is to use two of the systems shown in FIG. 3 or 6, having a common system clock, and an RS flip-flop. The accumulator in the first system resets to zero (has an initial value of 0), while the accumulator in the second system resets to $2^{(k-1)}$ (has an initial value of $2^{(k-1)}$), where k is the width of the accumulator. Hence, the output of the second system maintains a phase shift of π radians relative to the first. The 2 accumulators take the same input, and this can be a non-constant sequence if modulation is desired. The first system connects to the S input of the RS flip-flop, and produces the rising edges. The second system connects to the R input, and produces the falling edges.

There's another method for producing a 50% duty cycle that requires only one of the systems shown in FIG. 3 or 6. However, this method limits $F_{out}$ to less than $F_{clk}/2$. Assuming $F_{out} < F_{clk}/2$, there will be at most one rising or falling edge per cycle. The accumulator input is computed using $$\text{accum\_in} = 2^{(k+1)} \cdot \frac{F_{out}}{F_{clk}},$$

where k is the width of the accumulator. The output of the DTC is connected to the clock input of a JK flip-flop, where J and K are both tied to HIGH. The output toggles (reverses its state) after each pulse produced by the DTC. According to the above equation, accum_in is twice as large as it would be if the system of FIG. 3 or 6 were used without the JK flip-flop connected to the output.

In some applications the square wave will be coupled to a harmonic reduction filter that passes only the first harmonic; for example, the output of the DDS can be connected to an amplifier, and the output of the amplifier connected to a harmonic reduction filter, in order to produce a bandlimited radio frequency signal. The output of the DDS is not required to have a duty cycle of 50%; it is only required to have a duty cycle that is large enough to place sufficient energy in the first harmonic. For such an application, a system can comprise a modified version of the system in the previous paragraph. For $F_{out}<F_{clk}/2$, the system operates exactly as described above. For $F_{out}>F_{clk}/2$, a switch connects the output of the DTC directly to the output of the synthesizer, bypassing the JK flip-flop. For $F_{out}>F_{clk}/2$, the accumulator input is computed using $$\text{accum\_in} = 2^k \cdot \frac{F_{out}}{F_{clk}}.$$

Four of the systems shown in FIG. 3 or FIG. 6 can be combined in order to produce a square wave with $F_{out}>F_{clk}$, where $F_{clk}$ is the frequency of a system clock used by all 4 systems. All 4 systems take the same accumulator input; the equation used to compute the accumulator input is $$\text{accum\_in} = 2^{k-1} \cdot \frac{F_{out}}{F_{clk}}.$$

Hence, the value of the accumulator input is half of the value that would be computed using the regular equation. The accumulator input can be a non-constant sequence if modulation is desired. It can be shown that if the phase of the square wave produced by the composite system is given by $\omega_c t+\phi(t)$, the output of the accumulator in one of the systems is proportional to $0.5\omega_c t+0.5\phi(t)+\psi$, where $\psi$ is a constant that depends on the initial value in the accumulator register. A cycle in which the accumulator overflows corresponds to a cycle in which $0.5\omega_c t+0.5\phi(t)+\psi$ crosses through a multiple of $2\pi$. Hence, using 0 and $2^{k-1}$ for the initial value of 2 of the systems, these 2 systems compute the edge times of the even-numbered rising edges in the square wave at the output of the composite system, and the odd-numbered rising edges, respectively. The output of the DTC is coupled to a circuit that shortens the pulses to less than ¼ of the clock period, while preserving the rising edges of the pulses—the purpose is to ensure that a pulse in the output of one DTC does not overlap with a pulse in the output of the other DTC. The outputs of the DTCs of the two systems are combined using an OR gate, and the output of the OR gate is connected to the S input of an SR flip-flop. The other 2 systems use $2^{k-2}$ and $3 \cdot 2^{k-2}$ for the initial values of the accumulator register, and compute the falling edge times. The outputs of the DTC's are combined using an OR gate, and the output of the OR gate is connected to the R input of an SR flip-flop.

Dither Source. When the square wave at the output of the synthesizer is unmodulated, the accumulator input and $F_{out}$ are constant. The error sequence e(n), defined by $e(n)=t_n-t_{Q_n}$, where $t_n$ is the $n^{th}$ unquantized edge time and $t_{Q_n}$ is the $n^{th}$ quantized edge time, is periodic. Since this error sequence and the unquantized square wave, i.e. the square wave with edge times $t_n$, are both periodic, the quantized square wave, i.e. the square wave with edge times $t_{Q_n}$, is also periodic. It's well known that periodic waveforms have a line spectrum. The spectrum of the synthesizer output consists of the desired spectral line at $f_c$ and other spectral lines, representing spurs. In many applications the spurs are undesirable. It is possible to spread the energy contained in the spurs into a noise floor, using a dither source. Dither is a low level noise signal, and the dither source is typically implemented using a PN generator.

When the square wave at the output of the synthesizer is modulated, it may not be necessary to use a dither source. The modulation itself might be sufficient to whiten the error sequence, e(n). One of the deciding factors might be the spectrum analyzer settings that are specified for measuring the spurs. The time that the spectrum analyzer spends in each resolution element depends on the sweep time and other parameters.

Noise Shaping Loop. The error sequence, e(n), can be assumed white, since either the modulation whitens the noise, or a dither source is used. Since e(n) can be assumed white, the quantizer can be modeled by replacing it with a noise source generating a white noise sequence, q(n). Say this sequence has the z-transform, Q(z). Furthermore, say that the z-transform of the sequence at the input of the noise shaping loop, In(n), is IN(z). It is easily shown that the z-transform of the sequence at the output of the noise-shaping loop, Out(n), equals $$\text{OUT}(z)=\text{IN}(z)+Q(z)[1-G(z)]=\text{IN}(z)+E(z).$$

$$E(z)=Q(z)[1-G(z)].$$

E(z) is the z-transform of the edge time error sequence, e(n), defined in equation $$e(n)=t_n-t_{Q_n}$$

which is the error associated with the $n^{th}$ edge, i.e. the difference between the $n^{th}$ unquantized edge time and the $n^{th}$ quantized edge time. For applications that require a low level of quantization noise, the number of taps in the DTC, N, is relatively large compared to other applications such as clock generators. Assuming a large N, hence relatively small values of e(n), the spectral density of the two dominant noise terms approximately takes the shape of the magnitude squared of the FFT of $(-1)^n e(n)$ and the FFT of $(-1)^n [e(n)]^2$, respectively, where the frequency is left un-normalized and the sampling frequency for the FFT is $2f_c$. The equation for E(z) given above gives the z-transform of e(n), and from this the FFT of e(n) can easily be found, and the shape of the dominant noise terms predicted. Thus we are able to predict the PSD of the noise for a given loop filter, G(z). Also, we are able to design a loop filter, G(z), that will produce a desired spectral density shape.

Figure 12:
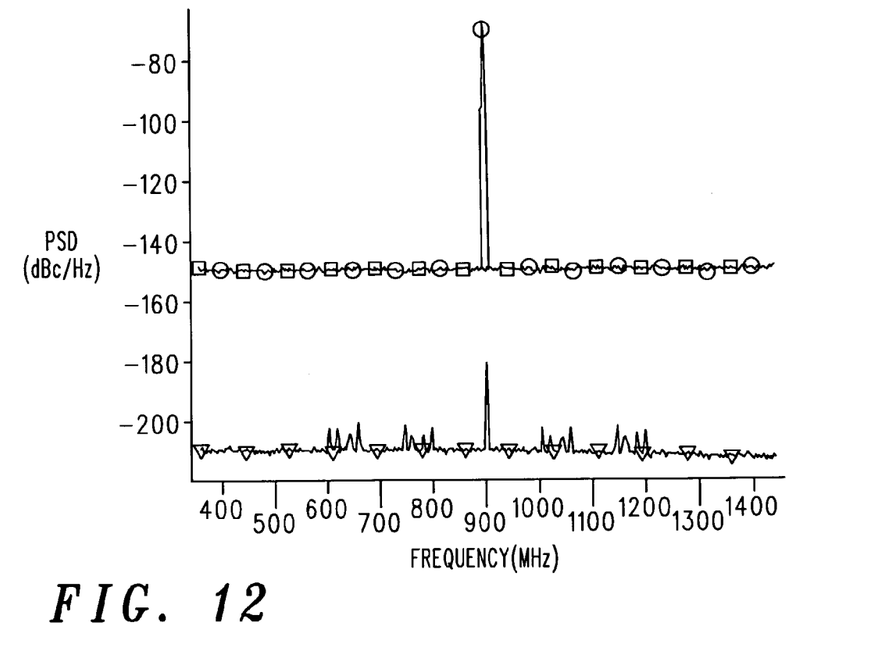
FIG. 12 is a chart illustrating the power spectral density of a modulated GSM signal with a carrier frequency of 900 MHz for a DDS with 1024 taps using a 1.25 GHz system clock with dither and no noise shaping loop.

For example, suppose the DDS produces a GSM signal (GMSK with BT=0.3, with a modulation rate of 270% kbauds) at a carrier frequency of 900 MHz. Assume that the DDS produces a 50% duty cycle through the use of two of the systems shown in FIG. 3 or 6 in parallel and an RS flip-flop—this is one of the ways of producing a 50% duty cycle. The system includes a dither source even though the modulation might be sufficient to whiten the noise without a dither source, perhaps depending on the spectrum analyzer setting specified for measuring spurs. However, the dither source ensures that there are no spurs. The dither is uniformly distributed between $-\frac{1}{2}$ and $\frac{1}{2}$. There are $2^{10}$ taps in the delay line, i.e. N=10 for the DTC, and $f_{clock}$=1.25 GHz. Referring to FIG. 12, the line with circle markers is the spectrum of the square wave at the output of the synthesizer computed using an FFT. The line with square markers is the PSD of the first-order quantization noise, and the line with triangle markers is the PSD of the second-order quantization noise. Outside the signal band, the spectrum of the square wave and the spectrum of the first-order noise virtually overlap. The total quantization noise is the sum of all noise terms, and has a flat PSD.

In the three spectra plot of FIG. 12, the normalizing constant is accurate for the noise floor. A different normalizing constant would be required to be accurate for the carrier power, since the frequency response of the window is wide compared to the modulated carrier. This explains why the peak level doesn't reach 0 dBc.

For broadband spectral emissions of a GSM handset, the noise in the receive band, from 935 to 960 MHz, is usually the limiting requirement. It is desirable to place a notch in the quantization noise at 947.5 MHz. A G(z) that provides such a notch can be derived as follows. As stated above, we assume that the DDS produces a 50% duty cycle through the use of 2 systems in parallel. One system produces the rising edges, and the other the falling. It can be shown that $$e(n) = \begin{cases} e_r\left(\frac{n}{2}\right), & n = 0, \pm 2, \pm 4, \ldots \\ e_f\left(\frac{n-1}{2}\right), & n = 1, \pm 3, \pm 5, \ldots \end{cases}$$

where $$e_r(n) \leftrightarrows q_1(z)[1-G(z)]$$

and $$e_f(n) \leftrightarrows q_2(z)[1-G(z)]$$

where $q_1(z)$ and $q_2(z)$ are the outputs of independent white noise sources. As already mentioned, the spectral density of the dominant noise takes the shape of the FFT of $(-1)^n e(n)$. Furthermore, $$FFT\{(-1)^n e(n)\} = FFT\{e_{r_{ex}}(n)\} - FFT\{e_{f_{ex}}(n)\}$$

where $e_{r_{ex}}(n)$ and $e_{f_{ex}}(n)$ are the sample rate expanded versions of $e_r(n)$ and $e_f(n)$ $$e_{r_{ex}}(n) = \begin{cases} e_r\left(\frac{n}{2}\right), & n = 0, \pm 2, \pm 4, \ldots \\ 0, & \text{otherwise} \end{cases}$$

$$e_{f_{ex}}(n) = \begin{cases} e_f\left(\frac{n-1}{2}\right), & n = \pm 1, \pm 2, \pm 3, \ldots \\ 0, & \text{otherwise} \end{cases}$$

It is well known what the effect is of sample rate expansion. If the magnitude squared of the FFT of $e_r(n)$ has a notch at $\kappa \cdot f_s$, then the magnitude squared of the FFT of $e_{r_{ex}}(n)$ has notches at $$\frac{\kappa f_s}{2}, \left(\frac{1}{2} - \frac{\kappa}{2}\right)f_s, \left(\frac{1}{2} + \frac{\kappa}{2}\right)f_s, \text{ and } \left(1 - \frac{\kappa}{2}\right)f_s.$$

For a notch at 947.5 MHz, since the solution of $$947.5 \text{ MHz} = \left(\frac{1}{2} + \frac{\kappa}{2}\right)2f_c$$

is K=0.0528 we require a notch in the frequency response of $e_r(n)$ at $0.0528 f_s$. This is achieved using $$1-G(z)=[1-z^{-1}e^{j\theta}][1-z^{-1}e^{j\theta}]$$

with $\theta=0.0528 \cdot 2\pi$. Hence, $G(z)=1.8910z^{-1}-z^{-2}$.

Figure 13:
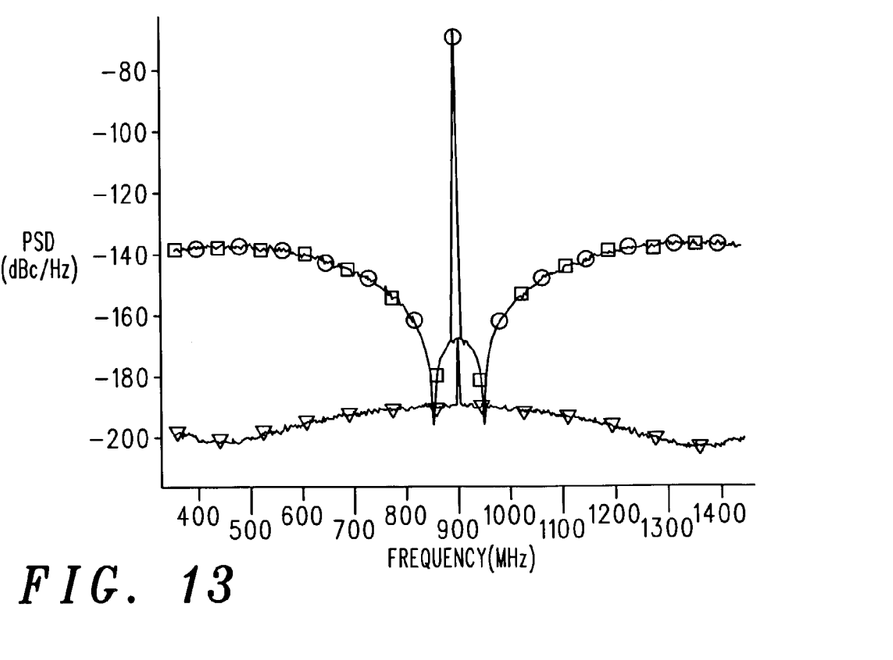
FIG. 13 is a chart illustrating the power spectral density of a modulated GSM signal with a carrier frequency of 900 MHz for a DDS with 1024 taps using a 1.25 GHz system clock with dither and a noise shaping loop in accordance with the present invention.

Continuing with the example, the spectrum of the output square wave after adding noise-shaping with this G(z) to the system is shown in FIG. 13. Note, as in FIG. 12, the circle, square and triangle markers similarly represent the spectrum of the square wave, the first-order quantization noise, and second-order quantization noise respectively. As already mentioned, the spectral density of the dominant noise term takes the shape of the magnitude squared of the FFT of $(-1)^n e(n)$ with $f_s=2f_c$, and the frequency un-normalized. The sampling frequency changes with $f_c$. Hence, a notch at an offset of $\kappa \cdot f_c$ from the carrier remains at an offset of $\kappa \cdot f_c$ from the carrier after changing the carrier frequency. This could be an advantage in certain systems. For example, for some applications it might be desirable to place a notch at exactly $f_c$, if for example it's desired to shape noise out of the signal band. After changing $f_c$, the notch remains exactly at $f_c$.

Compare this to the behavior of the prior art noise shaping loops such as those described in "Spur Reduction Techniques in Sine Output Direct Digital Synthesis" by Jouko Vankka (1996, IEEE) and in "A Direct-Digital Synthesizer with Improved Spectral Performance" by Paul O'Leary and Franco Maloberti (1991, IEEE). The prior art noise-shaping loops for DDS are for ROM-based DDS. In ROM-based DDS, 2 loops can be used, one that shapes the phase truncation (associated with the finite length of the ROM) and another that shapes the amplitude truncation (associated with the finite width of the ROM). In the case where the phase truncation and amplitude truncation loops both provide a notch in the noise centered on $f_c$, after a change in $f_c$ the notch provided by the amplitude truncation loop does not remain centered on $f_c$. If $f_c=f_{c1}$, and the amplitude truncation loop provides a notch at $f_{c1}$, then after changing $f_c$ to $f_c=f_{c2}$, the notch remains at $f_{c1}$. In order to move the notch to $f_{c2}$, the coefficients of the loop filter must be changed. Hence, for this application, where a notch is desired at the carrier frequency, the invention has an advantage.

Operationally, a DDS (and preferably a ROM-less DDS) in accordance with the present invention can provide a method of noise shaping a quantization noise comprising the steps of computing a plurality of time points for a corresponding plurality of edge times in a square wave referenced to a system clock, quantizing the plurality of time points to a plurality of adjacent edge opportunities where there are multiple edge opportunities within a single clock cycle of the system clock, and selectively noise shaping the quantization noise resulting from the step of quantizing. The step of selectively noise shaping can occur each time an accumulator overflows during a clock cycle of the system clock.

The noise shaping step ideally processes samples of the plurality of time points at a frequency of 2 times a frequency of the square wave at the output of the direct digital synthesizer which can reduce power consumption as previously explained. The step of noise shaping can include the step of feeding back a quantization error signal to a noise shaping filter and combining an output of the noise shaping filter with an input signal to a quantizer. The noise shaping can also notch out noise for a predetermined bandwidth adjacent to a carrier frequency and ideally remains relatively centered around the carrier frequency in a modulated system when changing the frequency of the square wave at the output of the DDS. The method can further include the step of dithering an input to the quantizer to reduce spurious noise. More particularly, the step of dithering can comprise dithering an input to the quantizer to reduce spurious noise when an output of the DDS is in an unmodulated mode and not dithering the input to the quantizer when the output of the direct digital synthesizer is in a modulated mode. In a transmitter system, the method can further comprise the steps of amplifying a square wave output and filtering using a harmonic reduction filter.

In light of the foregoing description of the invention, it should be recognized that the present invention can be realized in hardware, software, or a combination of hardware and software. A method and system for noise shaping in accordance to the present invention can be realized in a centralized fashion in one computer system, or in a distributed fashion where different elements are spread across several interconnected computer systems. The present invention may be implemented as an integrated digital CMOS circuit. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A direct digital synthesizer with noise shaping circuitry, comprising:
 a ROM-less direct digital synthesizer having a quantizer; and
 a noise shaping loop incorporating the quantizer for shaping a quantization noise due to noise from the quantizer.

2. The direct digital synthesizer of claim 1, wherein the quantizer creates noise due to edge time quantization.

3. The direct digital synthesizer of claim 1, wherein the noise shaping loop further comprises a noise shaping filter.

4. The direct digital synthesizer of claim 3, wherein the noise shaping loop feeds back to the noise shaping filter a difference between an input signal to the quantizer and an output signal from the quantizer.

5. The direct digital synthesizer of claim 1, wherein the noise shaping loop is a noise shaping feedback loop at an output of the quantizer.

6. The direct digital synthesizer of claim 1, wherein the ROM-less direct digital synthesizer further comprises a dither combined at an input of the quantizer.

7. The direct digital synthesizer of claim 1, wherein the noise shaping loop notches out noise for a predetermined bandwidth substantially adjacent to an output frequency of an output of the direct digital synthesizer and remains relatively centered around the output frequency when changing the output frequency.

8. A direct digital synthesizer, comprising:
 an accumulator coupled to a divider and providing a plurality of high-precision edge times referenced to a plurality of edges of a system clock;
 a noise shaping loop for receiving the plurality of high-precision edge times, wherein the noise shaping loop combines an error-feedback with the plurality of high-precision edge times to provide a plurality of modified edge times, wherein the loop selectively processes a high precision edge time depending on the availability of the high precision edge time;
 a quantizer within the noise shaping loop for quantizing the plurality of modified edge times and producing a plurality of output edge times.

9. The direct digital synthesizer of claim 8, wherein the availability of a high precision edge time is indicated by an overflow signal produced by the accumulator.

10. The direct digital synthesizer of claim 8, wherein the error-feedback results from correspondingly taking a difference between the plurality of modified edge times and the plurality of output edge times and filtering the difference through a noise shaping filter.

11. The direct digital synthesizer of claim 8, wherein the direct digital synthesizer further comprises a dither combined with the plurality of modified edge times to reduce spurious noise.

12. The direct digital synthesizer of claim 8, wherein the direct digital synthesizer serves as a local oscillator for at least one among a transmitter and a receiver.

13. The direct digital synthesizer of claim 8, wherein the direct digital synthesizer is implemented as an integrated digital CMOS circuit.

14. The direct digital synthesizer of claim 8, wherein the noise shaping loop notches out noise for a predetermined bandwidth substantially adjacent to an output frequency of an output of the direct digital synthesizer and remains relatively centered around the output frequency when changing the output frequency.

15. A method of noise shaping a quantization noise using a direct digital synthesizer, comprising the steps of:
- computing a plurality of time points for a corresponding plurality of edge times in a square wave referenced to a system clock;
- quantizing the plurality of time points to a plurality of adjacent edge opportunities where there are multiple edge opportunities within a single clock cycle of the system clock; and
- selectively noise shaping the quantization noise resulting from the step of quantizing.

16. The method of claim 15, wherein the step of noise shaping comprises the step of feeding back a quantization error signal to a noise shaping filter and combining an output of the noise shaping filter with an input signal to a quantizer.

17. The method of claim 16, wherein the method further comprises the step of dithering an input to the quantizer to reduce spurious noise.

18. The method of claim 16, wherein the method further comprises the step of dithering an input to the quantizer to reduce spurious noise when an output of the direct digital synthesizer is in an unmodulated mode and not dithering the input to the quantizer when the output of the direct digital synthesizer is in a modulated mode.

19. The method of claim 15, wherein the direct digital synthesizer is a ROM-less direct digital synthesizer.

20. The method of claim 15, wherein the step of noise shaping processes samples of the plurality of time points at a frequency of 2 times a frequency of the square wave at the output of the direct digital synthesizer.

21. The method of claim 15, wherein the step of noise shaping comprises the step of notching out noise for a predetermined bandwidth adjacent to an output frequency of the direct digital synthesizer.

22. The method of claim 21, wherein the step of notching remains relatively centered around the output frequency of the direct digital synthesizer when changing the frequency of the square wave at the output of the direct digital synthesizer.

23. The method of claim 15, wherein the step of selectively noise shaping the quantization noise comprises the step of selectively processing an edge time depending on the availability of an edge time.

24. The method of claim 23, wherein the availability of an edge time is indicated by the overflow signal produced by the accumulator.

* * * * *